S. H. GREEN AND J. D. OPIE.
METHOD OF MANUFACTURE OF MALT EXTRACT.
APPLICATION FILED DEC. 5, 1916.
1,391,159.
Patented Sept. 20, 1921.
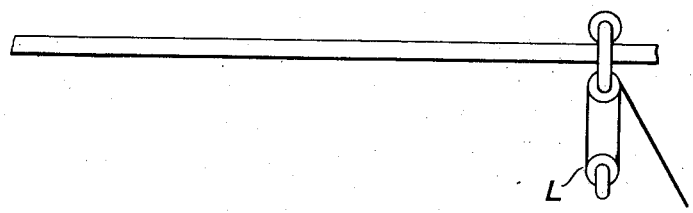
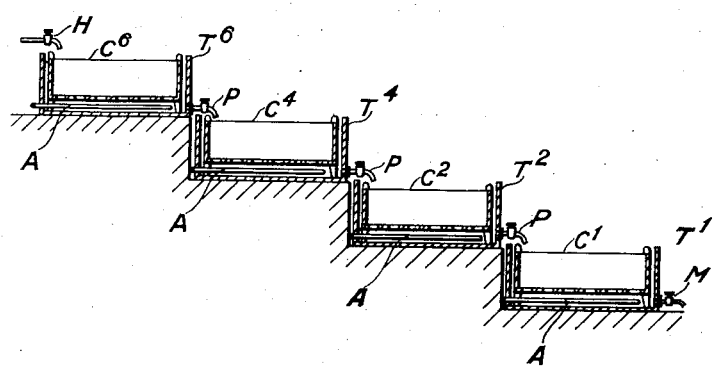

UNITED STATES PATENT OFFICE.

SAMUEL HAROLD GREEN, OF LELANT, AND JOHN DUNSTAN OPIE, OF HAYLE, ENGLAND.

METHOD OF MANUFACTURE OF MALT EXTRACT.

1,391,159.  Specification of Letters Patent.  Patented Sept. 20, 1921.

Application filed December 5, 1916. Serial No. 135,251.

(GRANTED UNDER THE PROVISIONS OF THE ACT OF MARCH 3, 1921, 41 STAT. L., 1313.)

*To all whom it may concern:*

Be it known that we, SAMUEL HAROLD GREEN, a subject of His Majesty the King of England, and resident of Lelant, in the county of Cornwall, Kingdom of England, and JOHN DUNSTAN OPIE, a subject of His Majesty the King of England, and resident of Hayle, in the county of Cornwall, Kingdom of England, have invented a certain new and useful Improved Method of Manufacture of Malt Extract, (for which we have filed an application in England, Dec. 1, 1915, No. 16,887,) of which the following is a specification.

We manufacture extract of malted barley or the like by means of a continuous diffusion process, preferably using green or unkilned materials.

In the manufacture of an extract of malted materials it is a simple and obvious possibility to obtain either a weak extract containing all the extractive matter or a strong extract, containing only a part thereof.

In the manufacture of such extracts for brewing where comparatively weak extracts are desired, the process is essentially one of saccharification followed by washing of the grains, and various processes of continuous washing have been devised. If it be desired to use such processes for the manufacture of malt syrups and the like a large amount of fuel is necessarily consumed in concentration. Moreover, the extracts which are desired by brewers are those in which diastatic and nitrogenous matter are limited; but it is greatly to be desired that such matter should be retained in an extract to be used for the production of a concentrated food or medicinal extract.

A manufacturer of such concentrated extracts containing this diastatic and nitrogenous matter aims at the production of an extract of high gravity so as to reduce the cost of concentration, but in consequence the yield is necessarily reduced through incomplete exhaustion of the grains.

In order that the conversion of starch shall be as complete as possible it is necessary that it be brought into contact first with a solution containing the greatest amount of active diastase. Any starch which may escape conversion by this action should then be subjected to the action of boiling water and later should be again treated with diastatic solution at suitable temperatures.

For the purpose of exhausting the grains of adhering extract as completely as possible, they should be successively treated with solutions of less gravity than the adherent solution, which is thus removed by diffusion, avoiding the use of undue quantities of water.

This invention aims at the realization of these desiderata simultaneously and continuously, and thus aims at the production of an extract of maximum strength and highest diastatic activity, and also at the complete exhaustion of the material.

According to our invention, instead of first saccharifying the malt in water and then washing the materials with more water of varying temperatures, as has hitherto been done, we so arrange our apparatus that these two processes of saccharification and washing are carried on simultaneously and continuously, in such a manner that the hot water in which the materials are finally exhausted is passed on with naturally decreasing temperature to become ultimately the first saccharifying medium for the fresh materials.

By means of attemperating coils we provide for that exceptional regulation of the temperature which may occasionally be required by unusual conditions, but under general and normal conditions, the temperature naturally adjusts itself to the requirements of the process.

We thus avoid the waste of fuel involved in other processes in which the temperatures of the reacting materials are arbitrarily varied, and attain our aims with less cost than in any other process.

The apparatus employed in accomplishing this consists of a series of tanks or vessels each provided with attemperating coils through which steam or water may be passed in order to regulate the temperature of the contents and of a series of suitably perforated containers which may be lifted in and out of the tanks or vessels by means of suitable apparatus.

The malted barley or the like suitably ground or crushed is placed in the containers and the containers are successively transferred from one tank to another, after a suitable period for extraction. Likewise, the extracting liquid is successively transferred from tank to tank in the opposite direction, so that the fresh malt is extracted in the tank containing an already strong extract, and the nearly exhausted malt is extracted with fresh liquid.

The temperature of the contents of the tanks is so regulated that the fresh malt is extracted at a suitably low temperature and the nearly exhausted malt at a much higher temperature.

The extract thus obtained is concentrated by means of vacuum pans or the like.

In the accompanying drawing, $T'$, $T^2$, $T^4$, $T^6$ represent members of a series of tanks each suitably lagged to minimize loss of heat, each provided with a cover not shown, and with attemperating coils A.

$C'$, $C^2$, $C^4$, $C^6$ represent suitably perforated containers.

The method of working is as follows:—
The container $C^6$ is removed from tank $T^6$ and its exhausted grains are suitably disposed of. The container from the tank next below is lifted by means of the lifting apparatus L and transferred to tank $T^6$ and in like manner throughout the series, container $C'$ being thus transferred to tank $T^2$. A container containing fresh malted materials is then placed in tank $T'$. After a suitable period generally about thirty or forty minutes, the malt extract is removed through outlet M for concentration, the liquid in tank $T^2$ is removed through outlet P into tank $T'$ and in like manner throughout the series. Boiling water is then run into tank $T^6$ by means of an inlet H. After a further suitable period generally about thirty or forty minutes the operation first described is repeated and the cycle of operation is continued.

The tanks may be arranged on the same level and any suitable means employed for transferring the liquid.

In the final tank where the nearly exhausted grains are subjected to the action of boiling water the starchy matters which may have escaped conversion in the earlier tanks are so modified that when they are carried again by the liquid to the earlier tanks, solution is insured.

In general, by the time the liquid has reached the lower tanks not only is it highly concentrated by the removal, by diffusion of the solutions successively adhering to the grains proceeding upward, but also its temperature has so fallen generally to about 120° or 130° F. that it is suitable for the extraction of fresh diastatic material. Such a suitable gradation of temperature throughout the series of tanks in regular steps from boiling temperature to about 120° or 130° F. results without the addition of heat so that the cost of fuel in the extraction process is practically limited to that required to boil the original charge of water.

What we claim is:—

The process of manufacturing extracts of malted materials, which consists in treating separated quantities of malted materials with hot water, in a series of steps, the first step being at the most favorable temperature for diastatic action and consisting chiefly in saccharifying the malted material with water already rich in extracted matters, intermediate steps consisting in further saccharification and partial washing of the malted materials for conversion of the starchy matters with the saccharifying action decreasing, the conversion increasing and the temperature increasing as the final step is approached, said final step consisting of a conversion at boiling temperatures whereby said starchy matters are carried into the earlier-treated quantities of malt, each step being carried out during a fixed interval of time, and afterward concentrating the extract so obtained.

In testimony whereof we have hereunto signed this specification.

SAMUEL HAROLD GREEN.
JOHN DUNSTAN OPIE.